(12) United States Patent
Meruva et al.

(10) Patent No.: US 10,359,745 B2
(45) Date of Patent: Jul. 23, 2019

(54) BUILDING SYSTEM COMMISSIONING AUTOMATION

(71) Applicant: Honeywell International Inc., Morris Plains, NJ (US)

(72) Inventors: Jayaprakash Meruva, Bangalore (IN); Manish Gupta, Bangalore (IN); Andrew David Halford, Manchester, MD (US); Cary Leen, Hammond, WI (US); Roy Alan Kolasa, Kansas City, MO (US)

(73) Assignee: Honeywell International Inc., Morris Plains, NJ (US)

( * ) Notice: Subject to any disclaimer, the term of this patent is extended or adjusted under 35 U.S.C. 154(b) by 398 days.

(21) Appl. No.: 15/185,884

(22) Filed: Jun. 17, 2016

(65) Prior Publication Data
US 2017/0364044 A1    Dec. 21, 2017

(51) Int. Cl.
| | |
|---|---|
| *G05B 15/02* | (2006.01) |
| *F24F 11/30* | (2018.01) |
| *F24F 11/62* | (2018.01) |
| *F24F 11/49* | (2018.01) |
| *F24F 11/63* | (2018.01) |
| *F24F 3/044* | (2006.01) |
| *F24F 11/56* | (2018.01) |

(52) U.S. Cl.
CPC ............. *G05B 15/02* (2013.01); *F24F 11/30* (2018.01); *F24F 11/49* (2018.01); *F24F 11/62* (2018.01); *F24F 3/044* (2013.01); *F24F 11/56* (2018.01); *F24F 11/63* (2018.01); *G05B 2219/2642* (2013.01)

(58) Field of Classification Search
CPC . G05B 15/02; F24F 11/30; F24F 11/62; F24F 11/49
See application file for complete search history.

(56) References Cited

U.S. PATENT DOCUMENTS

| | | | |
|---|---|---|---|
| 2014/0266669 A1* | 9/2014 | Fadell | G05B 19/042 340/501 |
| 2015/0156031 A1* | 6/2015 | Fadell | H04L 12/2816 700/276 |
| 2016/0292781 A1* | 10/2016 | Nahmad | F24F 11/30 |
| 2016/0343241 A1* | 11/2016 | Rossi | G08B 5/36 |
| 2017/0033944 A1* | 2/2017 | Nadathur | H04L 12/2816 |

\* cited by examiner

*Primary Examiner* — Douglas M Menz
(74) *Attorney, Agent, or Firm* — Seager, Tufte & Wickhem LLP

(57) ABSTRACT

Devices, systems, and methods for building system commissioning automation are described herein. One device includes a controller of a plurality of building system devices having logic to receive a set of commands specified by a sequence of operations (SOO) script, execute the set of commands to run an SOO check on the plurality of building system devices, and generate a report including results of the SOO check.

20 Claims, 3 Drawing Sheets

BUILDING SYSTEM COMMISSIONING AUTOMATION

TECHNICAL FIELD

The present disclosure relates to devices, systems, and methods for building system commissioning automation.

BACKGROUND

One or more building systems can be installed in a building to allow the management of aspects of the building. Building systems can include, for example, heating, ventilation, and air conditioning (HVAC) systems, access control systems, security systems, lighting systems, and fire systems, among others. A building system can refer a single building system (e.g., an HVAC system) and/or a system that manages a number of building systems (e.g., a building management system (BMS)).

Each building system typically includes a plurality of devices. When a building system is commissioned (e.g., at installation), a sequence of operations check (SOO) may be performed to determine that the devices are functioning as desired and/or the devices are communicating with one another as desired.

Previous approaches to building system commissioning may lack automation and may involve extensive on-site time for one or more commissioning engineers. The time taken may involve expenses not only for the engineers themselves, but also for the delay in the building becoming fully operational. In "Green Star" projects, for example, where recommissioning of an entire building is required within the first 12 months, these expenses may be doubly costly.

DETAILED DESCRIPTION

Figure 1:
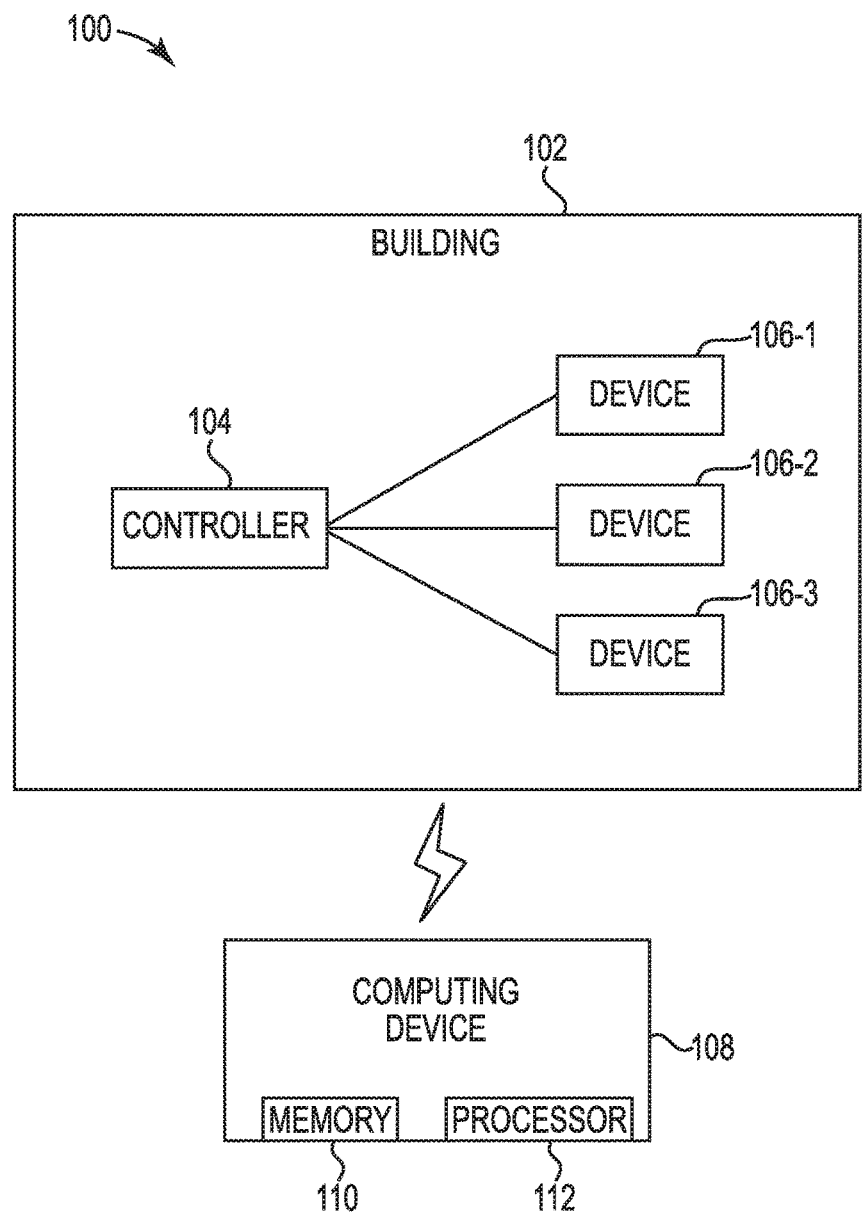
FIG. 1 illustrates a system for building system commissioning automation in accordance with one or more embodiments of the present disclosure.

Building system commissioning automation is described herein. For example, one or more embodiments include a controller of a plurality of building system devices having logic to receive a set of commands specified by a sequence of operations (SOO) script, execute the set of commands to run an SOO check on the plurality of building system devices, and generate a report including results of the SOO check. Embodiments of the present disclosure can streamline building system commissioning by automating sequence of operations (SOO) checks on system devices. As referred to herein, an SOO is sequence of test procedures for one or more system devices of a building. An SOO check can verify that a system (e.g., devices of the system) conforms to design specifications.

Embodiments of the present disclosure can ensure conformity to design specifications while reducing the time needed for commissioning. For example, previous approaches consider performing tests on devices and generating reports to be two different activities. Several days of effort by commissioning engineers may be consumed just for the generation of reports. The present disclosure allows report generation, in some embodiments, to be done automatically (e.g., without user input). As a result, overall project cost savings can be realized through the use of one or more embodiments herein.

According to previous approaches, a SOO check ("checkout") may involve a commissioning engineer having a sequence of test procedures for each device (piece of equipment, panel, etc.) written down in a spreadsheet. In an example of an air handling unit (AHU), there may be a standard sequence of operations for start/stop, warm up mode, supply air temperature control, return air carbon dioxide control, duct static pressure, return fan speed controls, unoccupied mode, smoke alarm interlock, filter status, etc. The commissioning engineer validates each of these steps in the procedure by connecting to a controller with online tools, issuing commands to the controller, and looking at the points one by one to verify that their values are correct in order to determine whether the test is passed or failed. The results are then manually captured in a spreadsheet and later used for the generation of reports.

In contrast, embodiments of the present disclosure can automate the SOO check such that the commissioning engineer may only need to verify generated results and/or reports. The generation of the report is not a separate activity; according to embodiments herein, commissioning engineers can spend more time on fixing problems (e.g., when a test fails) rather than on generating reports.

In some embodiments, an SOO automation script can be downloaded to a computing device (e.g., a cloud-hosted service) and control logic can be downloaded to a controller at the building. Site connectivity can be enabled on a temporary basis so that the computing device can connect to the controller and do read/write operations on point values based on the automation script for a period of time (e.g., one to two days). In some embodiments all of the controllers of a building can execute the SOO automation script in parallel and collect results. For each step of the SOO check, the computing device can issue a set of commands specified by the script to the controller. The controller can receive and execute these commands (sometimes referred to as "automation logic" or "logic"), and return results to the computing device. The computing device can execute logic functions on the received results to determine whether the step passed or failed. These evaluated results, along with measured point values and time stamps, can be stored in memory of the computing device for report generation.

In some embodiments the controller may not be connected to a remote computing device (e.g., the cloud-hosted service). Accordingly, the automation logic may be downloaded to the controller and executed by the controller responsive to an input from a local computing device (e.g., an operator station and/or mobile device). The controller can execute the automation logic for a particular period of time and record results. The local computing device can be connected to the controller and the results can be uploaded to the computing device.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. As used herein, "a" or "a number of" something can refer to one or more such things. For example, "a number of building systems" can refer to one or more building systems.

FIG. 1 illustrates a system 100 for building system commissioning in accordance with one or more embodiments of the present disclosure. As shown in FIG. 1, system 100 includes a building 102. The building 102 can refer to one or more structures, businesses, homes, plants, facilities, hospitals, refineries, etc. The building 102 includes a controller 104. The controller 104 can be a device configured to control operations of one or more building system devices. The controller 104 can be a building management system (BMS) controller.

Accordingly, the building 102 includes a device 106-1, a device 106-2, and a device 106-3 (cumulatively referred to as "devices 106"). It is noted that while three devices 106 are shown in FIG. 1, embodiments of the present disclosure do not limit building system devices to a particular number; the controller 104 can manage more or fewer devices than those shown. Additionally, though one controller is shown in FIG. 1, embodiments of the present disclosure are not so limited.

The devices 106 are devices of a building system. A building system can be an HVAC system, an access control system, a security system, a lighting system, and a fire system, among others. The devices 106 can be, but are not limited to, an air handling unit, a thermostat, a security camera, an access control device, a sensor, and an alarm. The devices 106 are devices that can be managed by the controller 104 and can participate in a network (e.g., a connected building system) of other devices. The devices 106 are wired and/or wirelessly connected to the controller 104 such that the devices 106 and the controller 104 can communicate information with one another.

The system 100 can include a computing device 108. Though in the example illustrated in FIG. 1 the computing device 108 is shown external to the building 102 (e.g., remote with respect to the building 102), embodiments of the present disclosure are not so limited. In some embodiments, the computing device 108 is internal to the building 102 (e.g., local with respect to the building 102). In some embodiments, the computing device 108 can be a remote server (e.g., a cloud-hosted service). In some embodiments, the computing device 108 can be a mobile device. In some embodiments, the computing device can be a local control panel and/or operator station.

The computing device 108 can include a memory 110 and a processor 112 configured to execute executable instructions stored in the memory 110 to perform various examples of the present disclosure, for example. That is, the memory 110 can be any type of non-transitory storage medium that can be accessed by the processor 112 to perform various examples of the present disclosure. For example, the memory 110 can be a non-transitory computer readable medium having computer readable instructions (e.g., computer program instructions) stored thereon that are executable by the processor 112.

The memory 110 can be volatile or nonvolatile memory. The memory 116 can also be removable (e.g., portable) memory, or non-removable (e.g., internal) memory. For example, the memory 110 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although the memory 110 is illustrated as being located within the computing device 108, embodiments of the present disclosure are not so limited. For example, the memory 110 can also be located internal to another computing resource (e.g., enabling computer readable instructions to be downloaded over the Internet or another wired or wireless connection).

In addition to, or in place of, the execution of executable instructions, various examples of the present disclosure can be performed via one or more devices (e.g., one or more controllers) having logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

As previously discussed, the computing device 108 can be a mobile device in some embodiments. The mobile device can be a client device carried or worn by a user. For example, the mobile device can be a phone (e.g., smartphone), personal digital assistant (PDA), tablet, and/or wearable device (e.g., wristband, watch, necklace, etc.). The mobile device can include one or more software applications (e.g., apps) which can define and/or control communications between the mobile device, the controller 104, and/or the devices 106. Apps may be received by the mobile device from one or more other computing devices. Apps may be launched by a user and/or responsive to some other condition. In some embodiments, apps can be executing as background apps.

Figure 2:
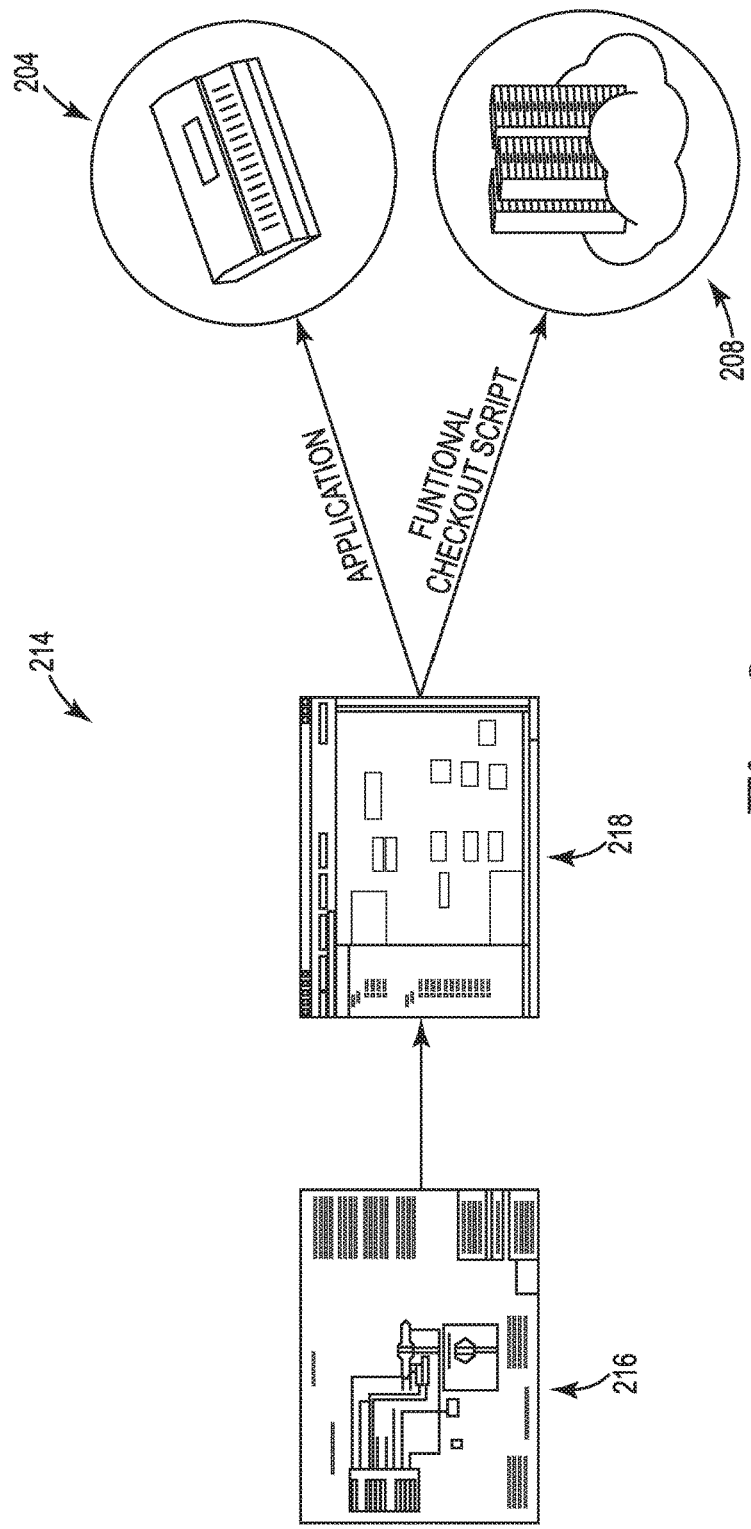
FIG. 2 illustrates a flow chart associated with building system commissioning automation in accordance with one or more embodiments of the present disclosure.

FIG. 2 illustrates a flow chart 214 associated with building system commissioning in accordance with one or more embodiments of the present disclosure. Flow chart 214 includes an SOO steps specification 216, hereinafter referred to as "steps spec 216." The steps spec 216 is a representation of the steps involved in an SOO check. The steps spec 216 can include written text and/or graphical representations. The steps spec 216 can be created via 2D and/or 3D modeling software, for instance. The steps spec 216 can illustrate devices of a building system and connections between those devices. The steps spec 216 can be specific to a particular building, a particular entity, and/or a particular type of entity, in some embodiments, and general in other embodiments.

In an example of a typical HVAC system, SOO steps may be well-defined (e.g., standardized). A project engineer can start with these SOO steps and customize them for project needs. In some embodiments, the changes can include modifying a constant value in application logic. In some embodiments, the changes can include removing a particular sequence which may not be applicable to a given system. The steps spec 216 can be customized with such changes.

At 218, the steps spec 216 is translated into an application logic. In some embodiments, that is, for each step in the SOO, a set of logical functions can be defined for use in SOO automation. The translation of the steps spec 216 into the application logic can be carried out via the execution of computer-readable instructions (e.g., software), for instance.

The application logic can include logic executable by a controller (e.g., controller 104, previously described in connection with FIG. 1) to perform a sequence of operations. The application logic is sometimes referred to herein as "control logic," a set of "commands" or "logical functions," or "logic." Additionally, a script associated with the application logic (an SOO script) can be generated at 218.

Embodiments of the present disclosure can create the application logic from the steps spec 216 based on a particular ontology and/or library defining system devices, functional relationships, and/or specifications. In some embodiments, the application logic can be created using an entity-relationship model. For example, the application logic can be created using an industry foundation classes (IFC) data model. In some embodiments, the application logic can be created using control loops (e.g., of a controller) and built directly with specific point names rather than point roles. One or more aspects of the creation of the application logic may be automated such that user input is not required. In some embodiments, the application logic can be created without user input.

The application logic can correspond to the steps spec 216. In an example of an air handling unit (AHU), the steps spec 216 may dictate for a "System Start/stop" step that "the supply fan and the return fan run whenever the system is started. A separate supply fan and return fan failure alarm is generated when a fan is enabled and status is not proven after a 60 second time delay on startup and 5 second time delay on loss of status when running."

For this example step, the set of logical functions in the application logic can include "Start AHU," "Monitor AHU Supply Fan Status and AHU Return Fan Status" for 60 seconds. If, for instance, the Supply and Return Status is in an "On" condition after 60 seconds then the test is considered as "Pass." Otherwise, it is considered as "Failed."

A script associated with the application logic, an SOO automation script, can be downloaded to a computing device 208, which, in some embodiments may be a cloud-hosted service as shown in FIG. 2, for instance. The application logic can be downloaded to a controller 204. It is noted that the computing device 208 and the controller 204 can be analogous to the previously-described computing device 108 and the controller 104, respectively, though embodiments of the present disclosure are not so limited.

To run the automated SOO check, in some embodiments, site connectivity can be enabled on a temporary basis so that the computing device 208 can connect to the controller 204 and do read/write operations on point values based on the automation script for a period of time while the application logic is being executed by the controller 204 (e.g., while the check is occurring).

The period of time to run the check can be selected in accordance with known SOO procedures to determine whether devices are configured properly. In some embodiments such a period of time can be one day. In some embodiments, the period of time can be two days. It is noted that the period of time is not intended to be limited to a particular period.

For each step of the SOO check, the computing device 208 can issue a set of commands specified by the script to the controller 204. The controller 204 can receive and execute these commands, and return results to the computing device 208.

Results, as referred to herein, are data generated by the controller resulting from the execution of the application logic. Results can include a list of logic functions executed, a list of devices tested, ordering of tests, measured point values associated with the devices tested, time stamps, etc. For example, for a variable air volume device, results can include room temperature(s), set point(s), damper position (s), airflow(s), etc.

In some embodiments, results may be returned as they are determined (e.g., in real time). In some embodiments, results may be returned at the completion of the SOO check, or at some other time, such as the completion of a step of the check.

The computing device 208 can execute logic functions on the received results to determine whether a particular step passed or failed. In some embodiments, this may be referred to as "evaluating" one or more results. Evaluating results can include comparing the results with industry standards, desired operating parameters, system requirements, etc. Passing or failing a step of an SOO check may include a result having variation from an expected and/or desired result (e.g., an "abnormality") that exceeds a particular threshold. As previously discussed, in an example, An AHU may fail a step if its Supply and Return Status is not in an "On" condition after 60 seconds.

The evaluated results can be stored in memory of the computing device 208, for instance. In some embodiments the raw, unevaluated, results may be similarly stored. The evaluated and/or unevaluated results (hereinafter referred to cumulatively as "results") can be used to generate reports, for instance. In some embodiments, reports can be generated without user input (e.g., automatically). A notification can be provided to a user that a report has been generated. A report can be communicated to a display of a computing device (not shown) for visualization by the user.

In some embodiments the controller 204 may not be connected to a cloud-hosted service (e.g., the computing device 208) while the SOO check is being executed. For example, a connection to a cloud-hosted service may be unavailable or undesirable for some or all of the period of time that the logic is being executed.

Accordingly, in some embodiments the application logic may be downloaded to the controller 204 and executed by the controller 204 responsive to an input from a different computing device (e.g., an operator station and/or mobile device). The controller 204 can execute the application logic for the particular period of time and record results (e.g., results analogous to those previously described). The local computing device can be connected to the controller and the results can be uploaded from the controller 204 to the computing device.

In some embodiments, the application logic can be downloaded to the controller 204 and can be run continuously to maintain comfort of a portion of the building. In such cases, the SOO check script of the application logic can be downloaded in addition to the application logic, and the SOO check script can run and collect results.

Whether a user is using a cloud-hosted service (e.g., the computing device 208) or some other computing device, the user can be provided with the results. The results may be in the form of a formal report, for instance. Abnormalities, such as failures of a SOO step, may be highlighted for the user.

The user, who may be a commissioning engineer in some embodiments, can travel to the building and remedy any abnormalities. Remedial action can include adjusting devices, performing maintenance on devices, reconfiguring devices, replacing devices, adding devices, subtracting devices, etc. For example, if a temperature of a room is unchanged for a day despite the damper of a variable air volume device being set in a fully open condition for that day, the cause may be that the damper rod is not connected properly to the damper such that the damper is actually in a closed position. A user (e.g., an engineer, technician, etc.) can inspect the device and take action to correct the problem. Thereafter, the automated SOO check can be re-executed (e.g., repeated and/or re-run). In some embodiments, only a portion of the SOO check associated with the abnormality can be re-executed.

Figure 3:
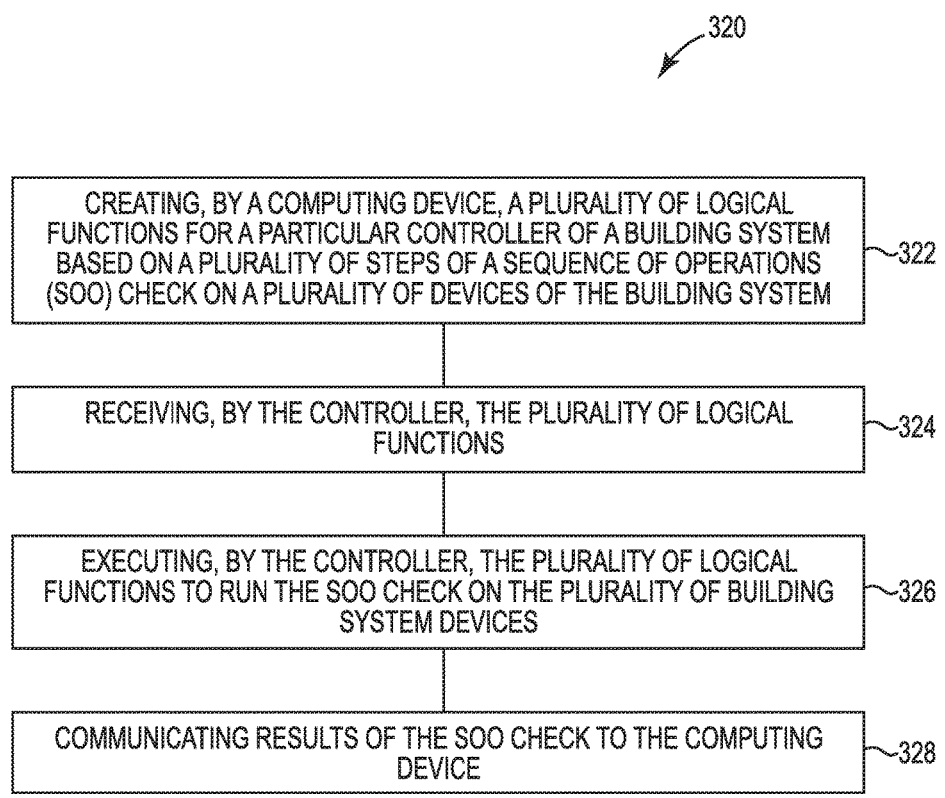
FIG. 3 illustrates a method for building system commissioning automation in accordance with one or more embodiments of the present disclosure

FIG. 3 illustrates a method 320 for building system commissioning in accordance with one or more embodiments of the present disclosure. In some embodiments, method 320 can be performed in part by a controller and in part by a computing device (e.g., such as those previously discussed), though embodiments of the present disclosure are not so limited.

At block 322, method 320 includes creating, by a computing device, a plurality of logical functions for a particular controller of a building system based on a plurality of steps of an SOO check on a plurality of devices of the building system. The plurality of logical functions can be (or be a part of) an application logic. The logical functions can be created from an SOO specification, for instance.

At block 324, method 320 includes receiving, by the controller, the plurality of logical functions. As discussed herein, the logic can be communicated to the controller from a remote location (e.g., a cloud-hosted service) and/or from another computing device, such as a mobile device, for instance.

At block 326, method 320 includes executing, by the controller, the plurality of logical functions to run the SOO check on the plurality of building system devices. The execution can be performed over a particular time period, which, in some embodiments, may last one or two days. Running the SOO check may involve activating and/or deactivating devices of the system, or adjusting states of devices of the system (e.g., changing a state of a damper).

At block 328, method 320 includes communicating results of the SOO check to the computing device. Results can be communicated as a report, for instance. The report may include abnormalities in the check, such as where a particular step failed, for instance.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A controller of a plurality of building system devices having logic to:
    receive a set of commands specified by a sequence of operations (SOO) script;
    execute the set of commands to run an SOO check on the plurality of building system devices, wherein executing the set of commands to run the SOO check on the plurality of building system devices includes:
        performing a sequence of test procedures for each of the plurality of building system devices, wherein the sequence of test procedures for each of the plurality of building system devices includes activating, deactivating, and adjusting a state of each of the plurality of building system devices; and
        determining results including a plurality of point values associated with each of the plurality of building system devices based on the test procedures; and
    generate a report including results of the SOO check.

2. The controller of claim 1, wherein the set of commands is received from a remote computing device.

3. The controller of claim 1, wherein the set of commands is received from a mobile device.

4. The controller of claim 1, wherein the controller includes logic to execute the set of commands over a particular period of time.

5. The controller of claim 4, wherein the particular period of time is one day.

6. The controller of claim 4, wherein the controller is one of a plurality of controllers of a building, and wherein the set of commands are executed by all of the plurality of controllers in parallel.

7. The controller of claim 1, wherein the report includes an abnormality determined during the SOO check.

8. The controller of claim 1, wherein the script is created without user input based on an SOO specification.

9. The controller of claim 1, wherein the results include measured point values and time stamps associated with the each of the plurality of building system devices.

10. The controller of claim 1, wherein the plurality of building system devices includes an air handling unit and a variable air volume device.

11. A system for providing access control via a mobile device, comprising:
    a plurality of building system devices of a building;
    a computing device configured to:
        issue a set of commands associated with a step of a sequence of operations check (SOO) specified by a script; and
    a controller in communication with the computing device and the plurality of building system devices and configured to:
        receive the set of commands;

execute the set of commands to run the step of the SOO check on the plurality of building system devices, wherein executing the set of commands to run the step of the SOO check on the plurality of building system devices includes:

performing a sequence of test procedures for each of the plurality of building system devices, wherein the sequence of test procedures for each of the plurality of building system devices includes activating, deactivating, and adjusting a state of each of the plurality of building system devices; and determining results including a plurality of point values associated with each of the plurality of building system devices based on the test procedures; and communicate results of the step of the SOO check to the computing device; and wherein the computing device is configured to determine whether the step passed or failed based on the results.

12. The system of claim 11, wherein the controller is configured to communicate the results of the step of the SOO check to the computing device during execution of the set of commands.

13. The system of claim 11, wherein the controller is configured to communicate the results of the step of the SOO check to the computing device after the set of commands is executed.

14. The system of claim 11, wherein if the step failed, the computing device is configured to notify a user of the failure.

15. The system of claim 14, wherein subsequent to the user taking a remedial action to correct the failure, the controller is configured to re-execute the set of commands to re-run the step of the SOO check on the plurality of building system devices.

16. A method for building system commissioning, comprising:

creating, by a computing device, a plurality of logical functions for a particular controller of a building system based on a plurality of steps of a sequence of operations (SOO) check on a plurality of devices of the building system;

receiving, by the controller, the plurality of logical functions;

executing, by the controller, the plurality of logical functions to run the SOO check on the plurality of building system devices, wherein executing the plurality of logical functions to run the SOO check on the plurality of building system devices includes:

performing a sequence of test procedures for each of the plurality of building system devices, wherein the sequence of test procedures for each of the plurality of building system devices includes activating, deactivating, and adjusting a state of each of the plurality of building system devices; and determining results including a plurality of point values associated with each of the plurality of building system devices based on the test procedures; and communicating results of the SOO check to the computing device.

17. The method of claim 16, wherein the plurality of steps are standardized steps associated with a sequence of operations check on a heating, ventilation, and air conditioning (HVAC) system.

18. The method of claim 16, wherein the plurality of steps of the SOO check is non-specific with respect to a particular building.

19. The method of claim 16, wherein the plurality of steps of the SOO check is specific with respect to a particular building.

20. The method of claim 16, wherein the method includes creating the plurality of logical functions using an entity-relationship model.

\* \* \* \* \*